(12) United States Patent
Shirota et al.

(10) Patent No.: US 7,324,474 B2
(45) Date of Patent: Jan. 29, 2008

(54) METHODS AND APPARATUS FOR NETWORK INITIATED DATA SERVICES

(75) Inventors: Masakazu Shirota, Kanagawa (JP); Jack Wallace Nasielski, San Diego, CA (US); Jun Wang, La Jolla, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 10/949,011

(22) Filed: Sep. 23, 2004

(65) Prior Publication Data

US 2005/0169249 A1   Aug. 4, 2005

Related U.S. Application Data

(60) Provisional application No. 60/520,544, filed on Nov. 14, 2003, provisional application No. 60/513,249, filed on Oct. 21, 2003.

(51) Int. Cl.
*H04Q 7/00* (2006.01)
*H04L 12/56* (2006.01)

(52) U.S. Cl. ............. 370/328; 370/395.2; 370/400; 455/432.1

(58) Field of Classification Search ......... 370/328, 370/331, 338, 389, 392, 395.2, 395.3, 400, 370/395.52; 455/432–452.2
See application file for complete search history.

(56) References Cited

U.S. PATENT DOCUMENTS 6,822,952 B2 * 11/2004 Abrol et al. ............... 370/338
6,912,214 B2 * 6/2005 Madour et al. ............ 370/340
7,043,249 B2 * 5/2006 Sayeedi .................... 455/445
7,065,062 B2 * 6/2006 Madour et al. ............ 370/331
2002/0145990 A1 * 10/2002 Sayeedi .................... 370/335
2003/0174679 A1   9/2003 Viola et al. ............... 370/338
2004/0063431 A1 * 4/2004 Julka et al. ............... 455/436
2005/0073969 A1 * 4/2005 Hart et al. ................ 370/318

FOREIGN PATENT DOCUMENTS

WO   03019973   3/2003
WO   04077707   9/2004

OTHER PUBLICATIONS

"3GPP; Technical Specification Group Services and System Aspects; Support of Push Service (Release 5)" 3GPP TR 23.875 V5.1.0, Mar. 2002, pp. 1-70, XP002290028.
Ozugur T: "Supporting dynamic IP addresses for wireless push services in cellular networks" IEEE Publications, Oct, 29, 2002, pp. 184-188, XP010611969.
"Network Initiated Data Session (NIDS) : Stage 1 Requirements", 3GPP2 S.R0090-0, V1.0, Jun. 10, 2004, pp. 1-11.

* cited by examiner

*Primary Examiner*—Chi Pham
*Assistant Examiner*—Tri H. Phan
(74) *Attorney, Agent, or Firm*—Roberta A. Young; Tom Rouse

(57) ABSTRACT

Techniques are provided for conserving network resources in a network that initiates data services by communicating push data to a dormant terminal. Selected network resources associated with the dormant terminal are released, and maintained information for reaching the dormant terminal is updated when the point of network attachment of the dormant terminal changes.

7 Claims, 13 Drawing Sheets

METHODS AND APPARATUS FOR NETWORK INITIATED DATA SERVICES

CLAIM OF PRIORITY UNDER 35 U.S.C. §119

The present Application for Patent claims priority to Provisional Application Nos. 60/513,249 entitled "Methods and Apparatus for Network Initiated Data Session and Short Message Delivery" filed Oct. 21, 2003 and 60/520,544, entitled "Null-State Registration For Network-Initiated Data Service" filed Nov. 14, 2003 and assigned to the assignee hereof and hereby expressly incorporated by reference herein.

BACKGROUND

Field

The present invention relates generally to wireless communications, and more specifically to Network-Initiated Data Services (NIDS).

Acronyms

For each of the following terms, the description below uses the following acronyms:
Authentication, Authorization and Accounting (AAA)
Access Network ID (ANID)
Base Station (BS)
Current Access Network ID (CANID)
Challenge Handshake Authentication Protocol (CHAP)
Domain Name System (DNS)
Foreign Agent (FA)
Foreign Agent Challenge (FAC)
Home Agent (HA)
Home Authentication, Authorization and Accounting (HAAA)
Home Application Gateway (HAGW)
Home Location Register (HLR)
Internet Protocol Control Protocol (IPCP)
Internet Protocol Reachability Service (IRS)
Link Control Protocol (LCP)
Message Center (MC)
Mobile Station (MS)
Mobile Switching Center (MSC)
Mobile Station ID (MSID)
Network Access Identifier (NAI)
Network Access Server (NAS)
Network Initiated Data Session (NIDS)
NIDS Reachability Information (NRI)
Previous Access Network ID (PANIID)
PPP Authentication Protocol (PAP)
Push Content Application (PCA)
Packet Control Function (PCF)
Packet Data Serving Node (PDSN)
Push Gateway (PGW)
Point to Point Protocol (PPP)
Radio Access Network (RAN)
Short Message Application (SMA)
Visited Authentication, Authorization and Accounting (VAAA)
Visited Application Gateway (VAGW)
Visited Location Register (VLR)

Wireless IP networks using cdma2000 are being widely deployed. Many wireless data applications today assume initial action by a mobile station to establish a data session with the network and make the mobile station reachable for the network to forward IP packets.

Always-On Services

A wireless terminal with "Always-On" capability may automatically establish a data session upon application of power, and maintain the session until power is turned off. For example, the IS-835-C standard for the cdma2000 wireless IP network supports Always-On connectivity. In addition, 3GPP2 has developed an all IP network that requires mobile stations to have Always-On connectivity to the IP network.

An Always-On Service ideally allows data to be pushed to wireless terminal any where, at any time, enabling users to use IP Push services. A network may send packets to users for services including E-mail notification, Short message delivery such as Instant message, interactive games, Multimedia message delivery, mobile-terminated VoIP call, IOTA data delivery and so forth.

One drawback associated with Always-On Service is that the network maintains resources for the wireless terminal even when it does not have any data activity.

For example, in order for the network to "push" data to a mobile, the network must currently maintain a dormant data session for a given mobile station when there is no data activity. This requires the maintenance of resources such as memory space, signaling traffic, PDSN resources, air interface resources, and IP address space. For instance, maintaining a dormant session in PCF for the wireless terminal requires memory space in the PCF. In addition, periodically renewing the R-P tunnel between the PCF and PDSN periodically adds unneeded signaling. PDSN resources are required to maintain the PPP state in the PDSN. Air interface resources associated with packet data mobility are needed since the mobile terminal must leave dormancy to notify the base station its location each time it moves into a new Packet Zone. If this results in an inter-PDSN handoff, a new PPP and Mobile IP registration are typically necessary which requires the use of Traffic Channel resources. Finally, IP address space is required to maintain an IP address for the mobile, and if IPv4 is used, there is a practical limit to the number of available addresses.

Because cdma2000 operators desire efficient use of PDSN and HA resources, cdma2000 operators may not provide the Always-On service because PDSN and HA resources are expensive. Consequently, in the IS-835-C standard, 3GPP2 has developed solutions for PDSN and HA resource management. However, if the operators do not provide the Always-On service, the MS may not be able to receive IP push services, as the connectivity resources for the MS in the PDSN and HA may have been removed.

Network-Initiated Data Services

A Network-Initiated Data Service (NIDS) addresses network resource issues associated with the Always-On Service. NIDS are beneficial for MSs that spend most of their time in a packet data dormant state. NIDS are useful when packet data capable devices, such as MSs, are in a "packet data disconnected condition" and a CN wishes to establish a data session with the mobile station (i.e. "push" data to the mobile station). NIDS can be useful, for example, with applications in which devices occasionally need to establish packet data communication sessions at times determined by the core network. Such applications may include, for example, e-mail notification, certain location-based applications, maintenance actions such as PRL download, among others. NIDS can also be useful, for example, in conjunction with services, such as Immediate Messaging or Multi-Media Messaging, that require "pushing" of data to the MS.

A goal of NIDS is to optimize network resources by delivering IP packets to a mobile station for which some of the resources have been reclaimed. Without NIDS, reaching the wireless terminal requires a packet data connection between the network and the wireless terminal, either by an "Always-On" service, or by means of mobile initiated connectivity.

For various administrative reasons the network may purge a PPP session for both Simple IP and Mobile IP or a binding record in the HA. The network can indicate this purge by sending a purge message to the wireless terminal, such as the Link Control Protocol-Term-Request or Agent advertisement. By receiving this purge message, the wireless terminal knows that the network has terminated IP connectivity.

However, if the wireless terminal is temporally out of coverage, the wireless terminal can not receive the purge message. When the wireless terminal comes back into the coverage, the wireless terminal assumes that IP connectivity is still being provided until a timer expires. This timer could be, for example, a Mobile IP registration life timer or Max PPP inactivity timer. In addition, the network may notify the wireless terminal that a packet data session is over when the PPP session is administratively purged, or a packet data session in the RAN has terminated, by sending a Link Control-Protocol-Term Request or release order to the wireless terminal.

Depending on the implementation, the wireless terminal may keep the Mobile IP home address, but goes into a null state, while a HA keeps a Mobile IP binding for the MS. As a result, a HA may receive packets destined to the registered MS. However, the packets can not be delivered to the wireless terminal by the PDSN because the network has already terminated IP connectivity.

There is therefore a need in the art for solutions to these problems.

SUMMARY

Techniques are provided for conserving network resources in a network that can provide a push data service and that initiates such push data services by communicating push data to a dormant terminal. According to one aspect network initiated data services are provided that support a push service while conserving network resources such as PPP state and A10 connection. IP addresses do not need to be conserved because the dormant terminal must have an IP address in order to receive push data. The entity that pushes data to the dormant terminal needs to know an IP address of the dormant wireless terminal.

According to one embodiment, the network includes a wireless terminal, a first packet data serving node, and a first radio access network. The wireless terminal has an IP address associated therewith. The first packet data serving node, responsive to wireless terminal profile information such as NIDS or IP Reachability Service (IRS), creates reachability information for the wireless terminal. The first radio access network generates a dormant indication upon detecting that the wireless terminal is dormant.

According to one aspect of the invention, upon receiving the dormant indication, the first packet data serving node removes a PPP state and requests that the first radio access network release an A10 connection. As such, selected network resources associated with the dormant terminal, such as the PPP state and the A10 connection are released.

According to another aspect, maintained information for reaching the dormant terminal is updated when the point of network attachment of the dormant terminal changes. In one embodiment, the first packet data serving node can maintain the reachability information for the dormant terminal.

DETAILED DESCRIPTION

The term "Packet Data Session" refers to a session during which a user will invoke and utilize a packet data service.

The term "Packet Data Disconnected Condition" refers to a condition of packet data connection in which network resources are not yet assigned to allow IP packets to be sent to the wireless terminal.

The term "Correspondent Node (CN)" refers to an initiator of IP packets being pushed to the MS.

The term "wireless terminal" refers to a receiver of the IP packets being pushed by the CN. The term "wireless terminal" can be used interchangeably with the terms "mobile station," "destination station," "subscriber station," "subscriber unit," "terminal" and "User Equipment (UE)," and refers to the hardware with which an access network communicates. For instance, in UMTS systems, the User Equipment (UE) is a device that allows a user to access UMTS network services and also preferably includes a USIM that contains all of a user's subscription information. A wireless terminal may be mobile or stationary, and can generally include any communicator, data device or terminal that communicates through a wireless channel or through a wired channel, for example, using fiber optic or coaxial cables. Wireless terminals may be embodied in devices that include but that are not limited to PC card, compact flash, external or internal modem, or wireless or wireline phone.

The term "dormant terminal" refers to a wireless terminal that is in a dormant state. A "dormant state" refers to a state where over-the-air channels have not been assigned to the wireless terminal, but both the wireless terminal and the network have the information required to quickly establish connectivity between the wireless terminal and the network.

The term "terminal profile information" refers to subscription information for each wireless terminal. Examples of such subscription information include NIDS, IRS, etc.

The term "push" refers to sending unsolicited data to a wireless terminal at the initiative of a CN.

The term "exemplary" means serving as an example, instance, or illustration. Any embodiment described as "exemplary" should not necessarily to be construed as preferred or advantageous over other embodiments.

Wireless IP Network

NIDS may be built upon a Wireless IP Network reference model as defined in 3GPP2 X.S0011, Wireless IP Network Standard. To describe the requirements for the NIDS service, a simplified wireless IP network reference model is shown in FIG. 1.

Figure 1:
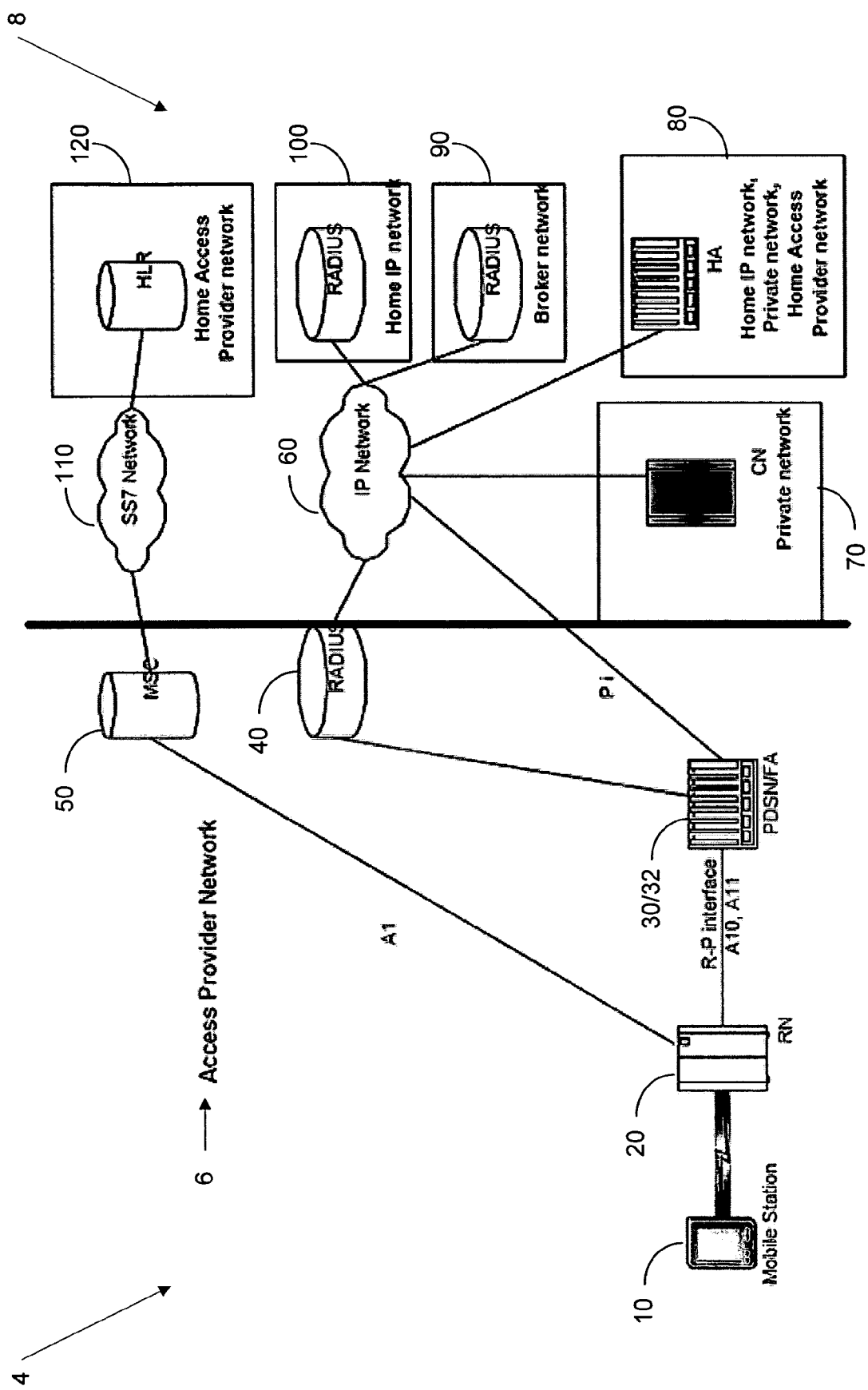
FIG. 1 is a simplified block diagram of a wireless IP network reference model.

FIG. 1 is a simplified diagram of a wireless IP network reference model 4 that comprises an Access Provider Network 6 that comprises a wireless terminal 10, a Radio Access Network 20, a Packet Data Serving Node (PDSN) 30 and Foreign Agent (FA) 32, a RADIUS server 40, and a Mobile Switching Center (MSC) 50, and a Home Network 8 that comprises an IP Network 60, a CN 70, a Home Agent (HA) 80, RADIUS servers 90, 100, a SS7 Network 110 and a Home Location Register (HLR) 120.

The wireless terminal 10 is coupled to the Radio Access Network 20, which is coupled to the Packet Data Serving Node (PDSN) 30 and Foreign Agent (FA) 32 via an R-P interface that includes an A10 interface and an A11 interface. The Radio Access Network (RAN) 20 includes a Packet Control Function (PCF) that controls transmission of packets between a Base Station (BS) (not shown) that is part of the RAN 20 and the PDSN 30. The A10 interface carries user traffic between the PCF and the PDSN, whereas the A11 interface carries signaling information between the PCF and PDSN.

The PDSN 30 is responsible for the establishment, maintenance and termination of a Point to Point Protocol (PPP) session with the Mobile Station (MS). The Point to Point Protocol was designed to provide router to router and host to network connections over synchronous and asynchronous circuits. The PDSN 30 may also assign dynamic IP addresses in addition to supporting MIP functionality. The PDSN provides a similar function to the GPRS Support Nodes (GSN) found in GSM and UMTS networks.

The FA is a mobility agent on the foreign network that can assist a mobile node in receiving datagrams delivered to a care-of address. The FA 32 is a node in a Mobile IP (MIP) network that enables roamed IP users to register on the foreign network. The FA 32 communicates with the Home Agent (HA) 80 to enable IP datagrams to be transferred between the home IP network 80 and the roamed IP user on the foreign network 6.

The Packet Data Serving Node (PDSN) 30 and Foreign Agent (FA) 32 are coupled to the RADIUS server 40 and IP network 60. The RADIUS server 40 is also coupled to the IP network 60.

The IP Network 60 is coupled to the CN 70, the Home Agent (HA) 80, and RADIUS servers 90, 100. RADIUS server 90 can be a broker network, whereas the RADIUS server 100 can be a home IP network.

The CN 70 can be a private network, and refers to node that sends packets to or receives packets from the wireless terminal; the correspondent node may be another mobile node or a non-mobile Internet node. The NIDS assumes that the CN 70 is capable of addressing and sending IP packets to the wireless terminal 10 at the assigned IP address.

The Home Agent (HA) 80 can be a home IP network, a private network, or a home access provider network. The HA refers to a node on the home network 8 that allows the mobile node to be reachable at its home address even when the mobile node is not attached to its home network 8. The HA routes data to mobile nodes currently attached to a foreign network via a tunnelling process in which a Care-of-Address (CoA) is used to deliver the data to the mobile node. In other words, the CoA refers to an IP address at the mobile node's current point of attachment to the Internet, when the mobile node is not attached to the home network. This CoA may be associated with the FA 32, in which case it is termed a FA CoA; or, it may be a co-located CoA (CCoA) meaning the mobile node is allocated an IP address in the foreign network. As such, the CCoA refers to a care-of address assigned to one of the mobile node's network interfaces, instead of one being offered by the FA 32.

The RAN 20 is also coupled to Mobile Switching Center (MSC) 50 via an A1 interface. The MSC is a telecommunication switch or exchange within a cellular network architecture capable of interworking with location databases. The Mobile Switching Center (MSC) 50 is coupled to the HLR 120 via the SS7 Network 110. The Home Location Register (HLR) 120 can be a home access provider network, and is a database within the Home Public Land Mobile Network (HPLMN) that provides routing information for Mobile Terminated (MT) calls and Short Message Service (SMS). The HLR also maintains user subscription information that is distributed to the relevant VLR or Serving GPRS Support Node (SGSN) through an attach process and mobility management procedures such as Location Area and Routing Area updates.

In NIDS, the wireless terminal 10 performs an air interface registration with the network and is assigned an IP address in order to be able to receive NIDS data using either a static or dynamic IP address. The wireless terminal can then be reached when in packet data disconnected condition (e.g. no PPP session exists). When the Wireless IP Network 60 receives an IP packet from the CN 70 addressed to the wireless terminal 10, the Wireless IP network can re-establish the resources and deliver the packet to the wireless terminal 10. The network provides information to allow the wireless terminal 10 to filter the data being downloaded and accept or deny the NIDS data. In a wireless terminal User Profile, the network maintains the wireless terminal's subscription status for Network Initiated Data capability as well as the activation status of the NIDS service for the subscriber. The NIDS can support subscriber roaming, and can use existing security mechanisms. The wireless terminal can reject a NIDS request received from the network. The subscription administrator can activate or deactivate the NIDS service for a subscriber.

Figure 2:
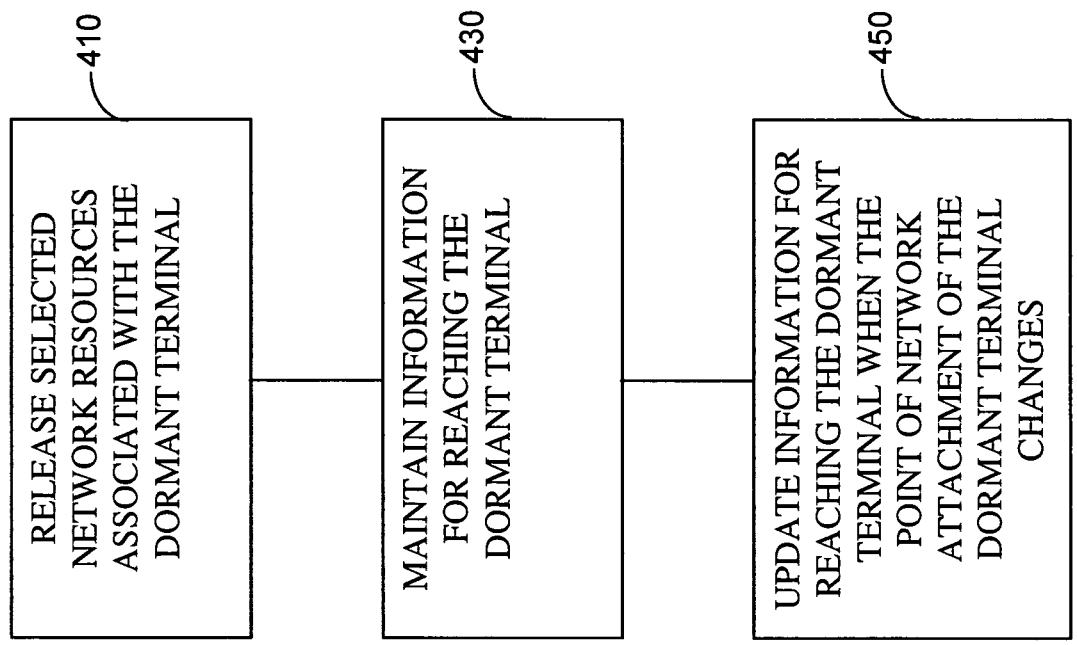
FIG. 2 is a flow chart of one embodiment of a method for conserving network resources in a network that communicates push data to a dormant wireless terminal authorized for NIDS.

FIG. 2 is a flow chart of one embodiment of a method for conserving network resources in a network that initiates data services by communicating push data to a dormant terminal. At step 410, selected network resources associated with the dormant terminal are released. At step 430, information for reaching the dormant terminal is maintained. At step 450, the information for reaching the dormant terminal is updated when the point of network attachment of the dormant terminal changes.

Figure 3:
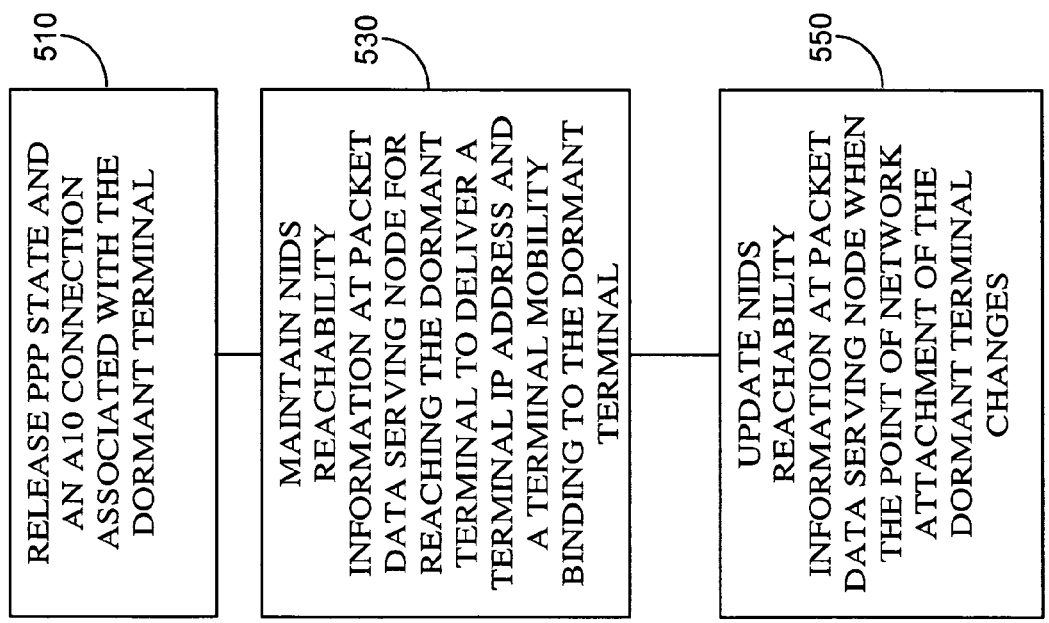
FIG. 3 is a flow chart of another embodiment of a method for conserving network resources in a network that communicates push data to a dormant wireless terminal authorized for NIDS.

FIG. 3 is a flow chart of another embodiment of a method for conserving network resources in a network that initiates data services by communicating push data to a dormant terminal. The dormant terminal may comprise a dormant wireless device such as a dormant mobile station authorized for network initiated data services. The dormant terminal is initially attached to the network at a first point of attachment that eventually changes. These methods can be applied, for example, in a wide variety of systems such as Simple IPv4, Simple IPv6, Mobile IPv4, Mobile IPv6, 1xRTT and 1xEV-DO.

Prior to step 510, an A10 connection can be established when the terminal powers on, and if authentication of the terminal is successful, terminal profile information is conveyed and an IP address is assigned to the terminal. Terminal profile information for reaching the dormant terminal is created. The terminal profile information may comprise NIDS Reachability Information (NRI) that comprises at least one of a wireless terminal Network Access Identifier (NAI), wireless terminal IP address, a PCF address, an Access Network ID (ANID), and a wireless terminal ID (MSID). The wireless terminal (MS) Network Access Identifier (NAI) uniquely identifies a user. The format of Network Access Identifier is similar to an e-mail address. The PCF address is an IP address of the Packet Control Function (PCF) that uniquely identifies a PCF. The Access Network ID (ANID) uniquely identifies a PCF serving area. The wireless terminal ID (MSID) uniquely identifies a device. One example of a MSID is an IMSI. In some embodiments, the NRI is less than 100 bytes per MS. For example, in one embodiment, the wireless terminal's Network Access Identifier (tens of bytes), wireless terminal's IP address (4 bytes for IPv4, 16 bytes for IPv6), PCF's IP address (4 bytes), IMSI (60 bits), and Current Access Network ID(47 bits). A message comprising the terminal Network Access Identifier, terminal IP address, PCF address, Access Network ID (ANID), and terminal ID is sent and the terminal IP address is updated. A mapping between the terminal Network Access Identifier, terminal IP address, and Network Access Identifier IP address is maintained.

At step 510, a PPP state and an A10 connection associated with the dormant terminal are released upon receiving a dormant indication indicating that the terminal is dormant. PPP state and A10 connection are network resources allocated for a user authorized for packet data connectivity. PPP state contains information for maintaining the (PPP) connection between the wireless terminal and PDSN. An A10 connection carries user traffic between a PCF and a PDSN. The PCF is an entity in the Radio Access Network that controls the transmission of packets between a Base Station (BS) and the Packet Data Serving Node (PDSN). The PPP state may be removed without sending a Terminate-Request to the terminal.

At step 530, information, such as NRI, for reaching the dormant terminal to deliver push data to the dormant terminal is maintained at a packet data serving node. The push data may comprise, for example, a terminal IP address and a terminal mobility binding. In some embodiments, the PDSN 30 only maintains minimum information, called NIDS Reachability Information (NRI), on how to reach the wireless terminal for delivering push data.

At step 550, the information for reaching the dormant terminal is updated when the point of network attachment of the dormant terminal changes. The point of network attachment of the dormant terminal changes, for example, when the terminal undergoes an intra-PDSN handoff or an inter-PDSN handoff. When the terminal undergoes an intra-PDSN handoff, a change is detected when the dormant terminal moves to a different radio access network. An A10 connection is established via A11 signaling that comprises a Previous Access Network ID, a Current Access Network ID, a terminal ID, and a terminal dormancy indication. Based on the terminal ID, it is determined that NRI for the terminal is present. Based on the received Previous Access Network ID, it can be determined that intra-PDSN handoff is occurring. When the terminal undergoes an inter-PDSN handoff, a change is detected when the dormant terminal moves to another radio access network. An A10 connection is established via A11 signaling that also includes Previous Access Network ID, Current Access Network ID, terminal ID, and terminal dormancy indication. When the terminal IP address has changed, the NRI for the dormant terminal is removed and the terminal IP address is released for future allocation. When the dormant wireless terminal 10 changes it's point of network attachment, the network's knowledge on how to reach the wireless terminal is updated. In one embodiment, the Access Network ID in the NRI is updated with a Current Access Network ID and release of the A10 connection for the terminal is requested upon undergoing an intra-PDSN handoff. A NIDS-capable PDSN 30 does not need to maintain PPP states, compression states (header and/or PPP payload compression), A10 connection, etc.

Following step 550, the network initiates the push data service by communicating push data to the dormant terminal. The push data may comprise, for example, at least one of a terminal IP address and a terminal mobility binding. According to one embodiment, the terminal IP address is obtained and packets addressed to the terminal are routed to a node that administers the terminal IP address. The packets are then buffered and the terminal ID and PCF address from the NRI are obtained based on the destination IP address of the packets. Thereafter, via A11 signaling, establishment of an A10 connection for the terminal is requested and after the A10 connection is established, PPP negotiation with the terminal is initiated. During the Internet Protocol Control Protocol, the same terminal IP address from the NRI is assigned and packets are delivered to the dormant terminal via the another radio access network. The A10 connection and PPP states can then be released while maintaining NRI for the terminal.

Thus, if a dormant wireless terminal 10 is authorized for NIDS, the network conserves resources by releasing a PPP state and A10 connections associated with the wireless terminal 10, while maintaining knowledge on how to reach the wireless terminal for delivering push data, such as, the MS's IP address and mobility binding information. In IS-835-D new PDSN behavior is specified to support NIDS, whereas a new 3GPP2-VSA is specified to convey NIDS. These embodiments do not impact the air interface and wireless terminal behavior, and the impact on IOS is minimal, requiring only the support of dormancy indicator in A11 signaling and the associated PCF behavior.

Exemplary Call Flows

Exemplary call flows will now be described where aspects of the invention are applied to Simple IP, Mobile IPv4 and Mobile IPv6. In the examples below, it's assumed that the wireless terminal has subscribed for NIDS and IP Reachability Service (IRS).

A. Simple IP

FIGS. 4A-4D are block diagrams of a network during a NIDS in which data is pushed to the terminal. FIG. 4E is a call flow diagram for an embodiment of the invention applied to Simple IP. FIG. 4E describes the NIDS procedures for Simple IP and how the network can provide push service while conserving network resources including PPP state and A10 connection.

Initiation of Packet Data Session

Figure 4A:
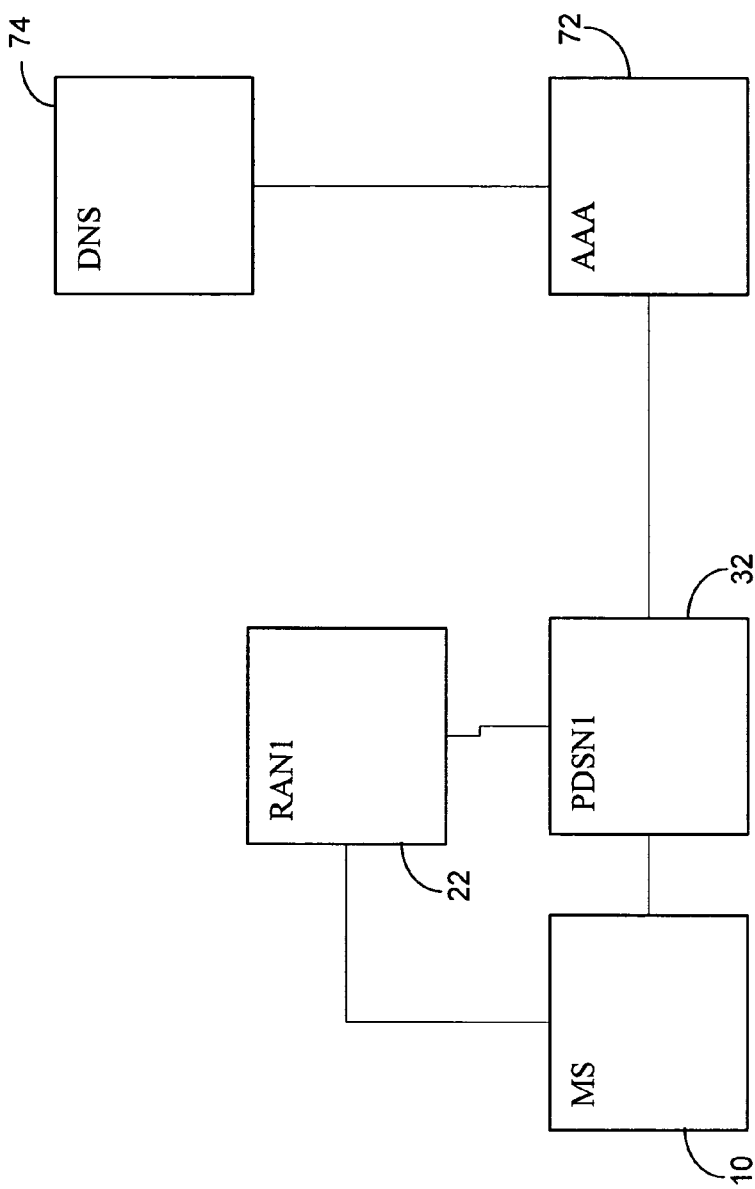
FIG. 4A is a block diagram of a network during initiation of a packet data session by the network.

FIG. 4A is a block diagram of the network during initiation of a packet data session by the network. FIG. 4A shows a wireless terminal 10, a first Radio Access Network (RAN1) 22, a first PDSN (PDSN1) 32, an Authentication, Authorization and Accounting (AAA) entity 72, and a Domain Name Server (DNS) 74.

After the wireless terminal 10 powers on, the wireless terminal 10 originates SO 33 or SO 59, and RAN1 22 selects PDSN1 32 and establishes an A10 connection to PDSN1 32. (Step 1) The wireless terminal 10 and PDSN1 32 negotiate Link Control Protocol. (Step 2) wireless terminal 10 is authenticated by the AAA 72 server via Challenge Handshake Authentication Protocol or PPP Authentication Protocol. (Step 3) If the authentication is successful, the AAA 72 server conveys wireless terminal 10 profile information (e.g., NIDS, IRS) to PDSN1 32 via RADIUS Access-Accept. (Step 3) An IPv4 address (or IPv6 address prefix) is assigned to the wireless terminal 10 via Internet Protocol Control Protocol (or Router Advertisement). (Step 4) Because the wireless terminal 10 profile indicates NIDS, PDSN1 32 creates NIDS Reachability Information (NRI) for the wireless terminal 10. (Step 5) The NRI is a mapping between the wireless terminal 10 Network Access Identifier, wireless terminal 10 IP address, PCF address, Access Network ID (ANID), and wireless terminal ID. wireless terminal ID (e.g., IMSI) and PCF address are made available to the PDSN via A11 signaling for the A10 connection setup. This procedure is the same for both 1xRTT and 1xEV-DO. In 1xEV-DO, if the access-network Challenge Handshake Authentication Protocol authentication is successful, the Access Network AAA 72 server assigns a temporary IMSI and conveys it to the PCF via RADIUS Access-Accept, so that the PCF can include the IMSI in the A11 signaling to the PDSN.

PDSN1 32 sends the RADIUS Account-Start containing the wireless terminal 10 Network Access Identifier, address, etc. Because the wireless terminal 10 profile indicates IRS, the AAA 72 server updates the DNS 74 server about the wireless terminal 10 IP address. (Step 6) The AAA 72 server also maintains a mapping between the wireless terminal 10 Network Access Identifier, wireless terminal 10 IP address, and Network Access Identifier IP address. After the PPP is established, the wireless terminal 10 may send/receive data, but if not, the wireless terminal 10 will become dormant. When RAN1 22 detects that the wireless terminal 10 is dormant, RAN1 22 sends the dormant indication to PDSN1 32 via A11 signaling. (Step 7) Because the wireless terminal 10 profile indicates NIDS, upon receiving the dormant indication, PDSN1 32 removes the PPP state without sending Terminate-Request to the wireless terminal 10 and requests RAN1 22 to release the A10 connection. (Step 8) But, PDSN1 32 maintains the NRI for the wireless terminal 10; thus, PDSN1 32 must not return the wireless terminal 10 address to the pool of available addresses. PDSN1 32 sends the RADIUS Accounting-Stop with an indication to the AAA 72 server not to update the DNS 74 server. (Step 9) The indication can be the Session-Continue attribute defined, for example, in IS-835.

Intra-PDSN Handoff

Figure 4B:
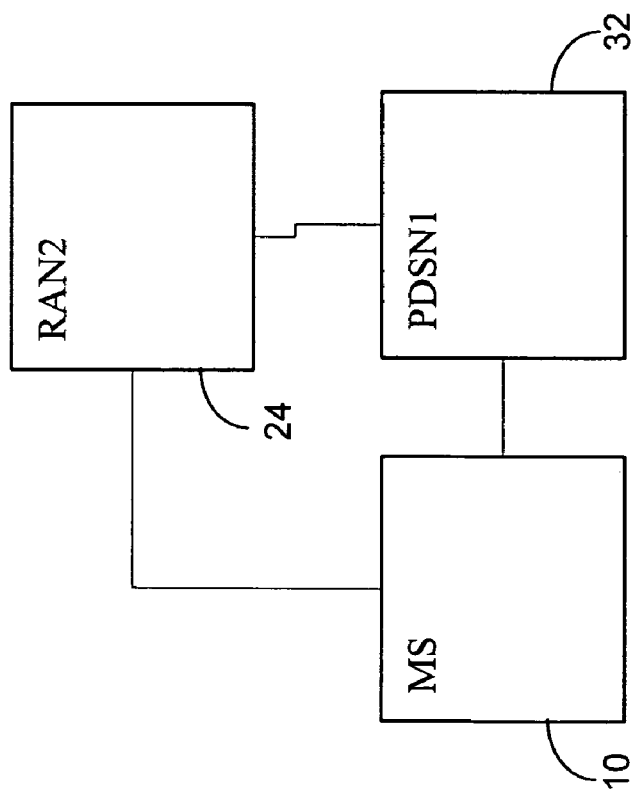
FIG. 4B is a block diagram of the network of FIG. 4A during intra-PDSN hand-off.

FIG. 4B is a block diagram of the network during intra-PDSN hand-off. FIG. 4B shows the wireless terminal 10, a second Radio Access Network (RAN2) 24, and the first PDSN (PDSN1) 32. The dormant wireless terminal 10 moves to RAN2 24 and detects a change in PZID/SID/NID (or subnet change in the case of 1xEV-DO). The wireless terminal 10 sends the Origination Message with DRS bit set to zero. RAN2 24 and PDSN1 32 are reachable. In this case, RAN2 24 establishes an A10 connection with PDSN1 32 via A11 signaling that also includes Previous Access Network ID, Current Access Network ID, wireless terminal ID, and wireless terminal 10 dormancy indication. (Step 10) Based on the wireless terminal ID, PDSN1 32 determines that it has NRI for the wireless terminal 10. Based on the received Previous Access Network ID, PDSN1 32 determines that it's an intra-PDSN handoff, updates the Access Network ID in the NRI with the Current Access Network ID, and requests RAN2 24 to remove the A10 connection for the wireless terminal 10. (Step 11) There is no PPP negotiation.

Inter-PDSN Handoff

Figure 4C:
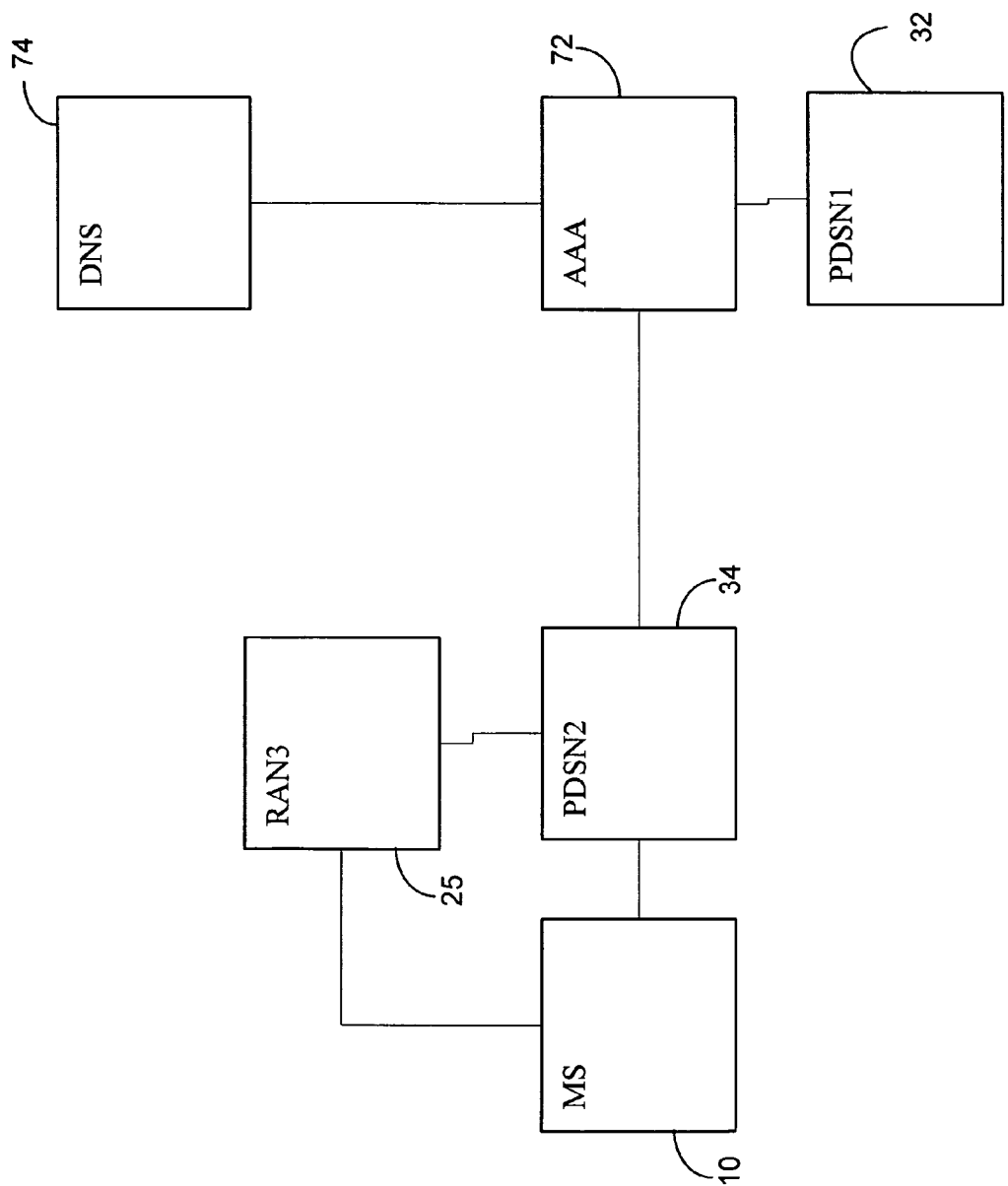
FIG. 4C is a block diagram of the network of FIG. 4B during inter-PDSN hand-off.

FIG. 4C is a block diagram of the network during Inter-PDSN hand-off. FIG. 4C shows the wireless terminal 10, a third Radio Access Network (RAN3) 25, a second PDSN (PDSN2) 34, the first PDSN (PDSN1) 32, the Authentication, Authorization and Accounting (AAA) entity 72, and the Domain Name Server (DNS) 74. The dormant wireless terminal 10 moves to RAN3 25 and detects a change in PZID/SID/NID (or subnet change in the case of 1xEV-DO). The wireless terminal 10 sends the Origination Message with DRS bit set to zero. Assume that RAN3 25 and PDSN1 32 are not reachable. In this case, RAN3 25 selects PDSN2 34 and establishes an A10 connection to PDSN2 34 via A11 signaling that also includes Previous Access Network ID, Current Access Network ID, wireless terminal 10 ID, and wireless terminal 10 dormancy indication. (Step 12) Thereafter, steps 2 to 9 described above repeat. Next, the AAA 72 server notices that the wireless terminal 10 IP address has changed. Thus, the AAA 72 server sends the RADIUS Disconnect-Request to PDSN1 32 to remove the NRI for the wireless terminal 10 and release the wireless terminal 10 IP address for future allocation. (Step 14)

Push Data

Figure 4D:
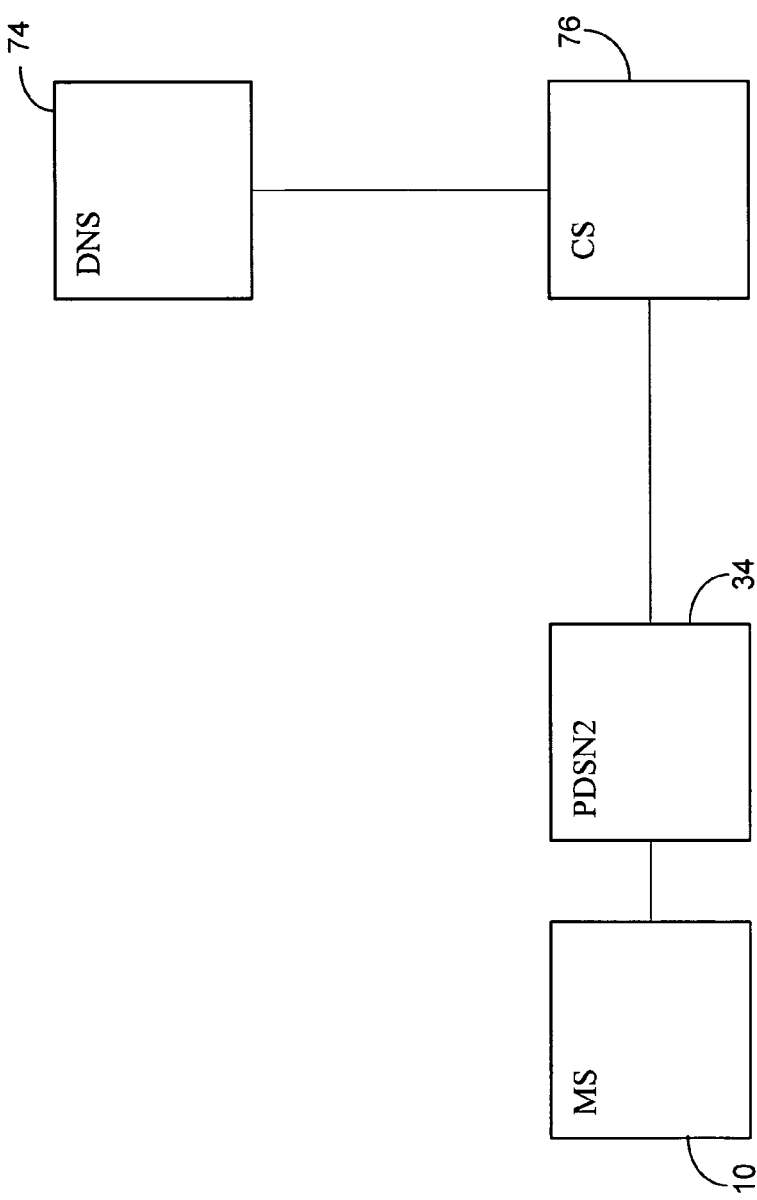
FIG. 4D is a block diagram of the network of FIG. 4C when data is being pushed to the wireless terminal.
Figure 4E:
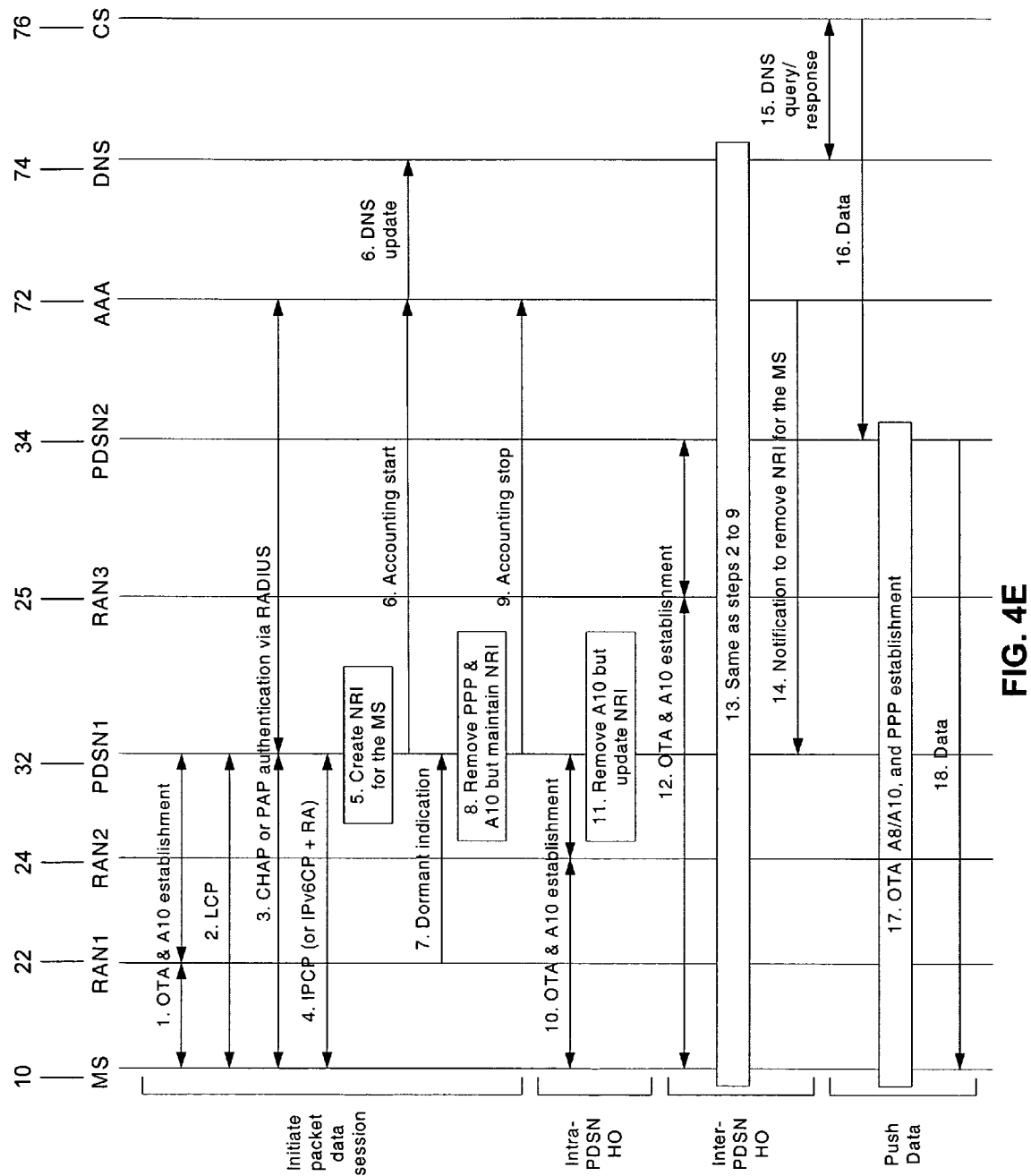
FIG. 4E is a call flow diagram for an embodiment of the invention applied to Simple IP.

FIG. 4D is a block diagram of the network when data is being pushed to the wireless terminal. FIG. 4D shows the wireless terminal 10, a second PDSN (PDSN2) 34, the Domain Name Server (DNS) 74 and a Content Server (CS) 76. Content Server (CS) wishes to push data to the wireless terminal 10. The CS 76 obtains the wireless terminal 10 IP address via DNS 74 query/response. (Step 15) The CS 76 sends packets addressed to the wireless terminal 10. The packets are routed to PDSN2 34 that administers the wireless terminal 10 IP address. (Step 16) PDSN2 34 buffers the packets. Based on the destination IP address of the packets, PDSN2 34 obtains the wireless terminal ID and PCF address from the NRI. Via A11 signaling, PDSN2 34 requests RAN3 25 to establish an A10 connection for the wireless terminal 10. After A10 is established, PDSN2 34 initiates PPP negotiation (Link Control Protocol, Challenge Handshake Authentication Protocol or PPP Authentication Protocol, Internet Protocol Control Protocol) with the wireless terminal 10. During Internet Protocol Control Protocol, PDSN2 34 assigns the same wireless terminal 10 IP address from the NRI. (Step 17) RADIUS message exchange for authentication and accounting start is not shown in the figure. PDSN2 34 delivers the packets to the wireless terminal 10 via RAN3 25. (Step 18) When the wireless terminal 10 becomes dormant, RAN3 25 notifies PDSN2 34. As before, A10 connection and PPP states in PDSN2 34 are released, but PDSN2 34 maintains the NRI for the wireless terminal 10. RADIUS message exchange for accounting stop is not shown in the figure.

B. Mobile IPv4

FIGS. 5A-5D are block diagrams of another network during a NIDS in which data is pushed to the terminal. FIG.

5E is a call flow diagram for an embodiment of the invention applied to Mobile IPv4. FIG. 5E describes null-state registration procedures for Mobile IPv4 and how the network can provide push service while conserving network resources (PPP state and A10 connection).

Initiate Packet Data Session

Figure 5A:
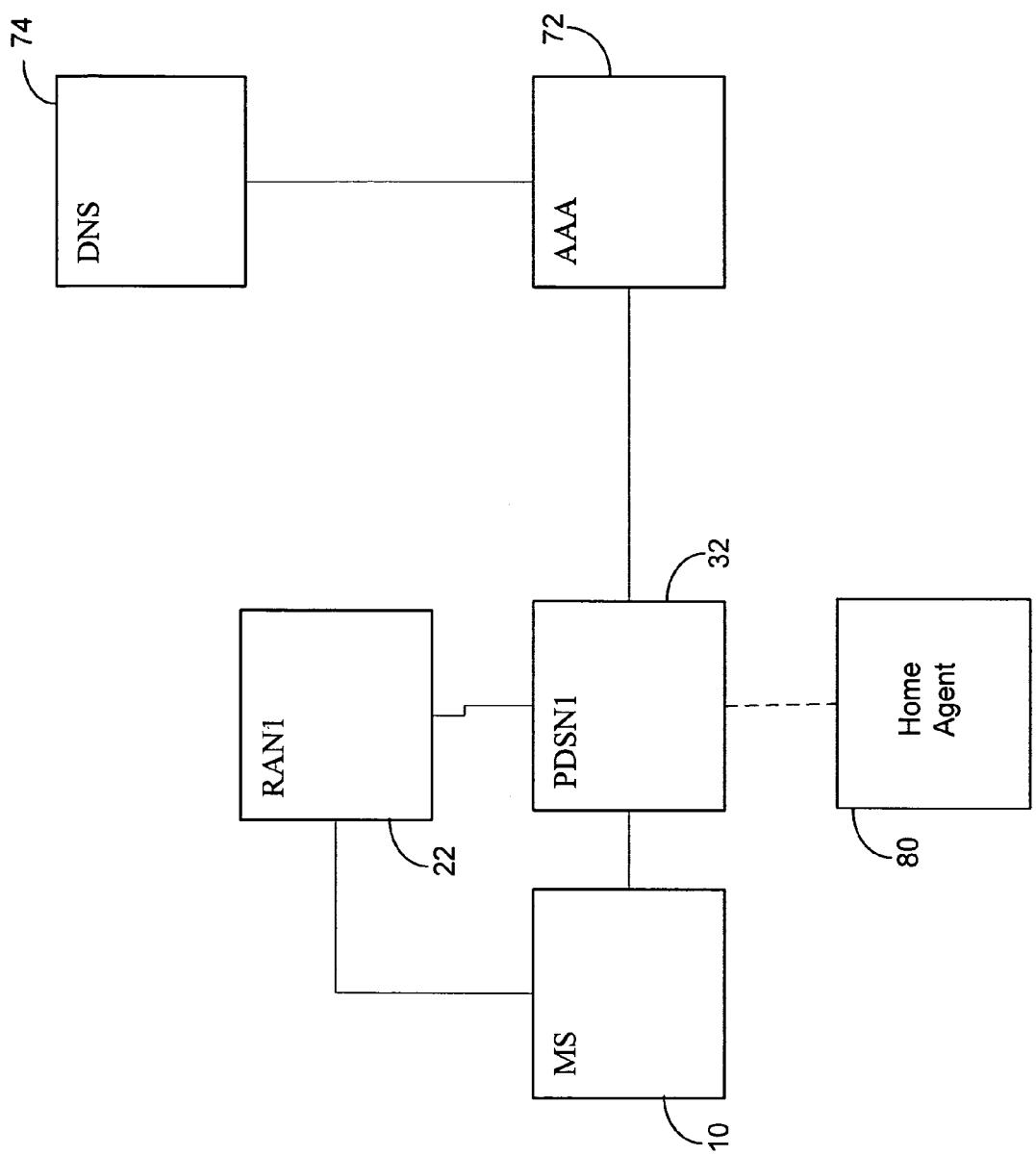
FIG. 5A is a block diagram of another network during initiation of a packet data session by the network.

FIG. 5A is a block diagram of the network during initiation of a packet data session by the network. FIG. 5A shows a wireless terminal 10, a first Radio Access Network (RAN1) 22, a first PDSN (PDSN1) 32, a home agent (HA) 80, an Authentication, Authorization and Accounting (AAA) entity 72, and a Domain Name Server (DNS) 74. The AAA 72 securely determines the identity and privileges of a user and to track that user's activities. For simplicity in illustration, this document lumps Authentication, Authorization and Accounting (AAA) and Push Gateway (PGW) as a single entity that performs AAA and Push Gateway functions. It should be appreciated, however, that AAA/PGW can be implemented as separate entities After the wireless terminal 10 powers on, the wireless terminal 10 originates SO 33 or SO 59. RAN1 22 selects PDSN1 32 and establishes an A10 connection to PDSN1 32. (Step 1) The wireless terminal 10 and PDSN1 32 negotiate Link Control Protocol and Internet Protocol Control Protocol per IS-835. (Step 2) After PPP is established, PDSN1 32 sends Mobile IP Agent Advertisements to the wireless terminal 10. (Step 3) The wireless terminal 10 performs Mobile IP registration. If the Foreign Agent Challenge authentication is successful, the AAA 72 server conveys wireless terminal 10 profile information (e.g., NIDS) to PDSN1 32 via RADIUS Access-Accept. If the registration is successful, the HA 80 conveys wireless terminal 10 home address in the Mobile IP Registration Reply. Since wireless terminal 10 profile indicates IRS, either the AAA 72 server or HA 80 performs DNS 74 update. (Step 4) The start of RADIUS accounting is not shown.

Because the wireless terminal 10 profile indicates NIDS, PDSN1 32 creates NIDS Reachability Information (NRI) for the wireless terminal 10. (Step 5) The NRI is a mapping between the wireless terminal 10 Network Access Identifier, wireless terminal 10 IP address (i.e., home address), PCF address, Access Network ID (ANID), and wireless terminal ID. The wireless terminal 10 may send/receive data, but if not, the wireless terminal 10 will become dormant. When RAN1 22 detects that the wireless terminal 10 is dormant, RAN1 22 sends the dormant indication to PDSN1 32 via A11 signaling. (Step 6) Upon receiving the dormant indication, PDSN1 32 removes the PPP state for the wireless terminal 10 and requests RAN1 22 to release the A10 connection, because the wireless terminal 10 profile indicates IRS. But, PDSN1 32 maintains the NRI and the visitor list entry for the wireless terminal 10. RADIUS accounting stop is not shown in the figure. (Step 7)

Intra-PDSN Hand Off

Figure 5B:
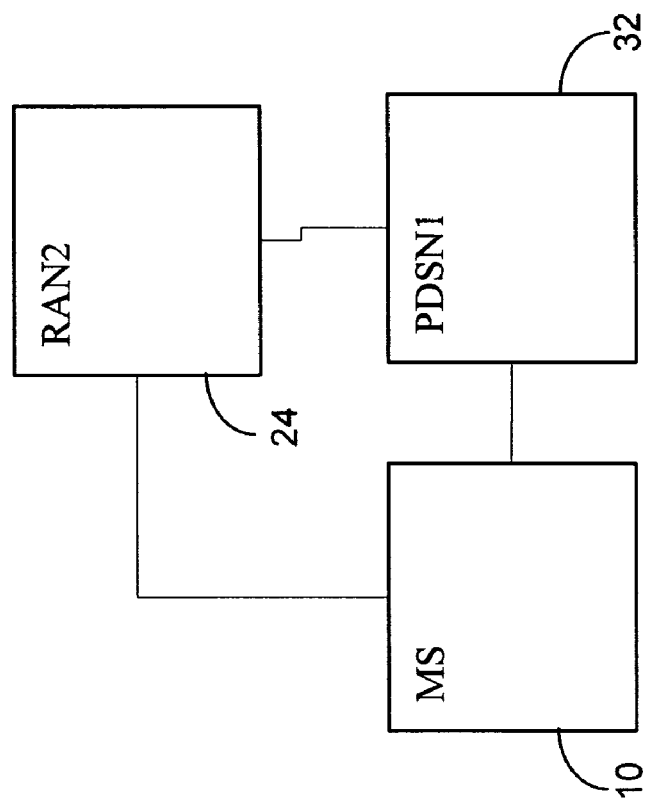
FIG. 5B is a block diagram of the network of FIG. 5A during intra-PDSN hand-off.

FIG. 5B is a block diagram of the network during intra-PDSN hand-off. FIG. 5B shows the wireless terminal 10, a second Radio Access Network (RAN2) 24, and the first PDSN (PDSN1) 32. The dormant wireless terminal 10 moves to RAN2 24 and detects a change in PZID/SID/NID (or subnet change in the case of 1xEV-DO). The wireless terminal 10 sends the Origination Message with DRS bit set to zero. Assume that RAN2 24 and PDSN1 32 are reachable. In this case, RAN2 24 establishes an A10 connection with PDSN1 32 via A11 signaling that also includes Previous Access Network ID, Current Access Network ID, wireless terminal ID, and wireless terminal 10 dormancy indication. (Step 8) Based on the wireless terminal ID, PDSN1 32 determines that it has NRI for the wireless terminal 10. Based on the received Previous Access Network ID, PDSN1 32 determines that it's an intra-PDSN handoff, updates the Access Network ID in the NRI with the Current Access Network ID, and requests RAN2 24 to remove the A10 connection for the wireless terminal 10. (Step 9)

Inter-PDSN Hand Off

Figure 5C:
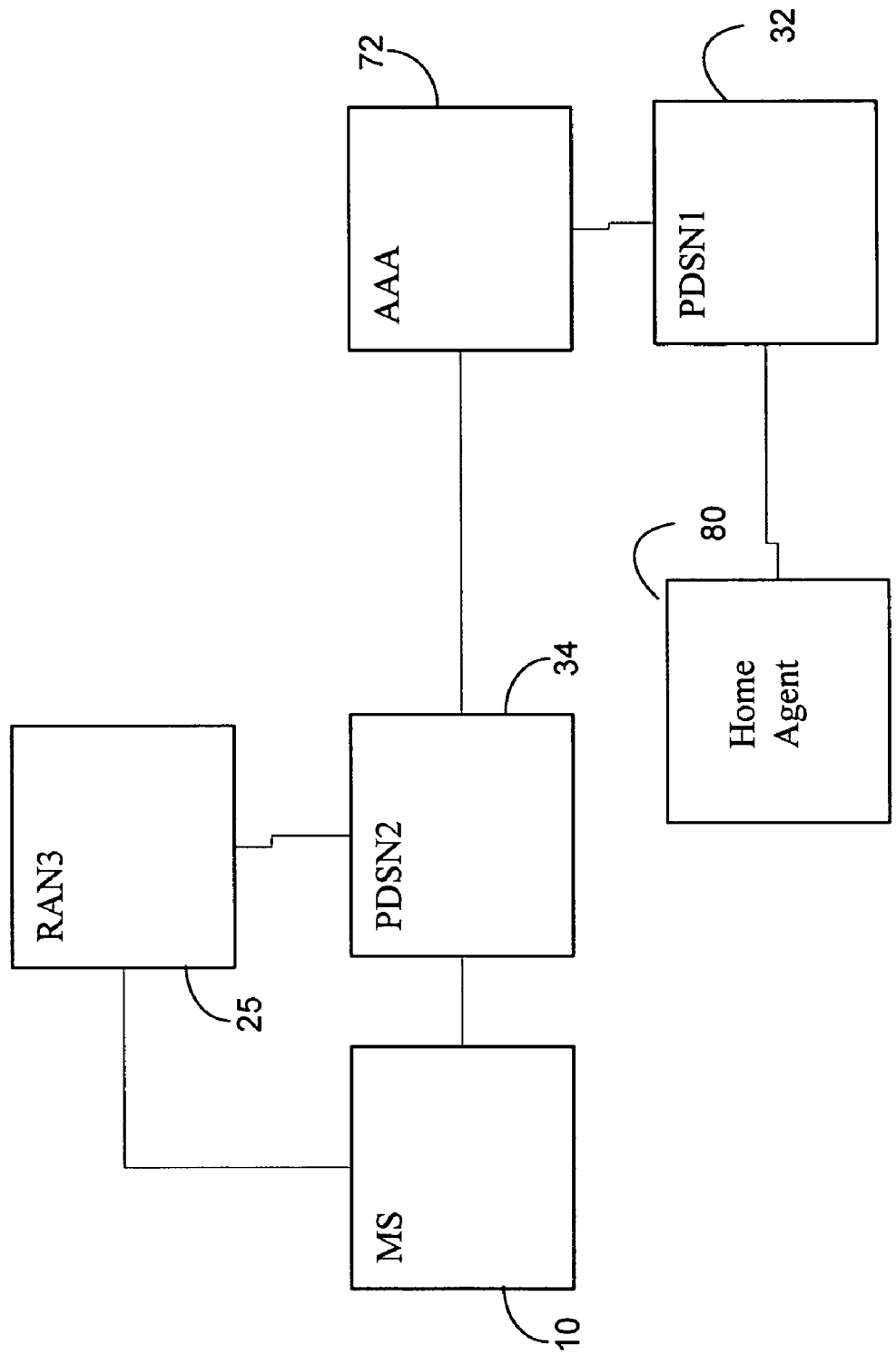
FIG. 5C is a block diagram of the network of FIG. 5B during inter-PDSN hand-off.

FIG. 5C is a block diagram of the network during Inter-PDSN hand-off. FIG. 5C shows the wireless terminal 10, a third Radio Access Network (RAN3) 25, a second PDSN (PDSN2) 34, a home agent (HA) 80, the first PDSN (PDSN1) 32, and the Authentication, Authorization and Accounting (AAA) entity 72. The dormant wireless terminal 10 moves to RAN3 25 and detects a change in PZID/SID/NID (or subnet change in the case of 1xEV-DO). The wireless terminal 10 sends the Origination Message with DRS bit set to zero. Assume that RAN3 25 and PDSN1 32 are not reachable. In this case, RAN3 25 selects PDSN2 34 and establishes an A10 connection to PDSN2 34 via A11 signaling that also includes Previous Access Network ID, Current Access Network ID, wireless terminal ID, and wireless terminal 10 dormancy indication. (Step 10) Step 11 is the same as steps 2 to 7 above, except there is no DNS 74 update, and will not be repeated here for sake of simplicity. (Step 11) The HA 80 notices that the wireless terminal 10 has changed PDSN/FA. Thus, the HA 80 sends the Mobile IP Revocation to PDSN1 32 to remove the visitor list entry and NRI for the wireless terminal 10. (Step 12)

Push Data

Figure 5D:
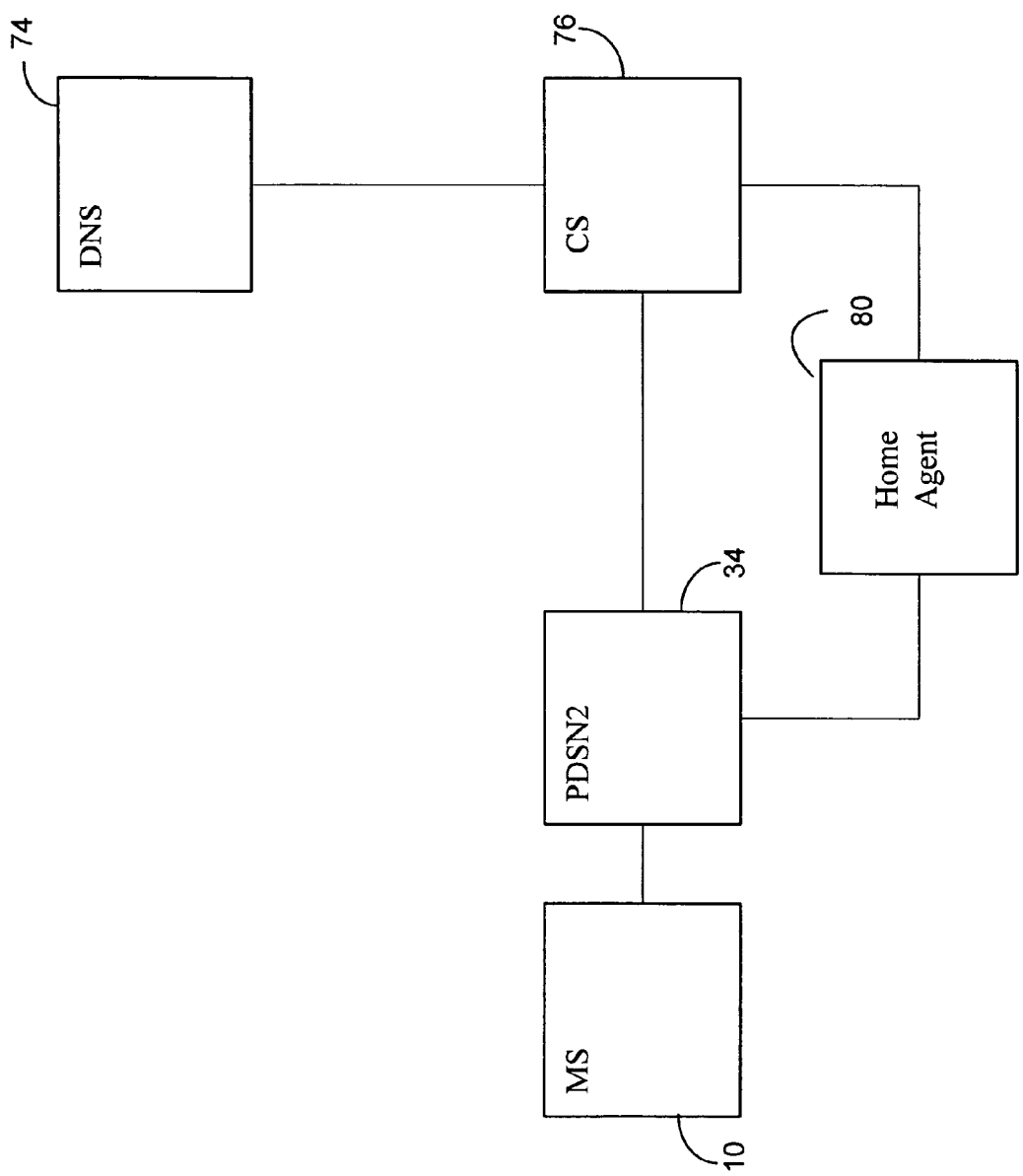
FIG. 5D is a block diagram of the network of FIG. 5C when data is being pushed to the wireless terminal.
Figure 5E:
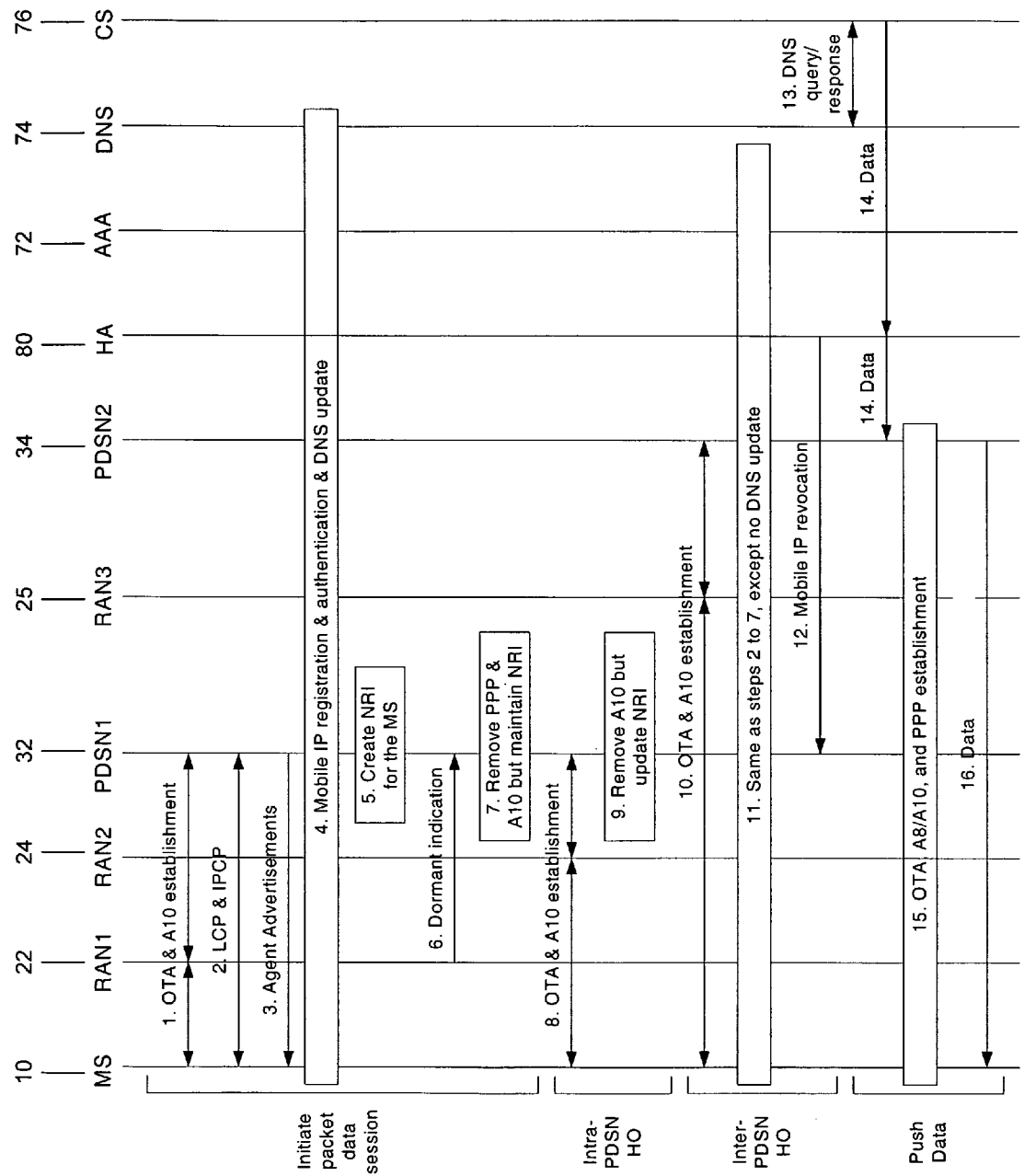
FIG. 5E is a call flow diagram for an embodiment of the invention applied to Mobile IPv4.

FIG. 5D is a block diagram of the network when data is being pushed to the wireless terminal. FIG. 5D shows the wireless terminal 10, a second PDSN (PDSN2) 34, a home agent (HA) 80, the Domain Name Server (DNS) 74 and a Content Server (CS) 76. The Content Server (CS) wishes to push data to the wireless terminal 10. The CS 76 obtains the wireless terminal 10 IP address via DNS 74 query/response. (Step 13) The CS 76 sends packets addressed to the wireless terminal 10. The packets are routed to PDSN2 34 via the HA. PDSN2 34 buffers the packets. (Step 14) Based on the destination IP address of the packets, PDSN2 34 obtains the wireless terminal ID and PCF address from the NRI. Via A11 signaling, PDSN2 34 requests RAN3 25 to establish an A10 connection for the wireless terminal 10. PDSN2 34 initiates PPP negotiation (LCP and Internet Protocol Control Protocol) with the wireless terminal 10. Since PDSN2 34 already has a visitor list entry and NRI for the wireless terminal 10, PDSN2 34 doesn't need to send Mobile IP Agent Advertisements after the PPP is established. (Step 15) PDSN2 34 delivers the packets to the wireless terminal 10 via RAN3 25. (Step 16) When the wireless terminal 10 becomes dormant, RAN3 25 notifies PDSN2 34. As before, A10 connection and PPP states in PDSN2 34 are released, but PDSN2 34 maintains the NRI and visitor list entry for the wireless terminal 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, in Mobile IPv6, the call flow would be similar to FIG. 4E with the following distinctions. After Step 4, the wireless terminal 10 performs Mobile IPv6 registration with a HA 80 (not shown). The wireless terminal 10 sends a binding update that contains the new COA. The new COA is formed by appending the IPv6 address prefix (in the Router Advertisement sent by PDSN in Step 4) to the wireless terminal 10's Interface ID. In step 6, DNS 74 update is not required because the wireless terminal 10 home address is static. During inter-PDSN handoff (Step 13), DNS 74 update is not required. In Step 16, the data packets sent from the CS 76 are routed to PDSN2 34 via the HA 80 (not shown).

Thus, the present invention is not intended to be limited to the embodiments shown herein but is to be accorded the widest scope consistent with the principles and novel features disclosed herein.

What is claimed is:

1. A network that provides a push service while conserving network resources including a PPP state and an A10 connection, comprising:
   a wireless terminal having an IP address associated therewith;
   a first packet data serving node that, responsive to wireless terminal profile information, creates reachability information for the wireless terminal;
   a first radio access network that generates a dormant indication upon detecting that the wireless terminal is dormant,
   an Access Network Authentication, Authorization and Accounting (AAA) server, wherein the first packet data serving node receives wireless terminal profile information from the Access Network Authentication, Authorization and Accounting (AAA) server if the wireless terminal is authenticated;
   a PCF, and
   wherein if a access-network Challenge Handshake Authentication Protocol authentication is successful, the Access Network AAA server assigns a temporary IMSI and conveys the temporary IMSI to the PCF via RADIUS Access-Accept such that the PCF can include the IMSI in A11 signaling to the packet data serving node; and
   wherein, upon receiving the dormant indication, the first packet data serving node removes the PPP state and requests that the first radio access network release the A10 connection.

2. The network of claim 1, further comprising:
   a Domain Name Sewer (DNS), and when the wireless terminal profile indicates IRS, the AAA sewer updates the DNS server about the wireless terminal IP address and maintains a mapping between a wireless terminal Network Access Identifier, wireless terminal IP address, and Network Access Identifier IP address.

3. A network that provides a push service while conserving network resources including a PPP state and an A11 connection, comprising:
   a wireless terminal having an IP address associated therewith;
   a first packet data serving node that, responsive to wireless terminal profile information, creates reachability information for the wireless terminal;
   a first radio access network that generates a dormant indication upon detecting that the wireless terminal is dormant; wherein, upon receiving the dormant indication, the first packet data serving node removes the PPP state and requests that the first radio access network release the A10 connection;
   a third radio access network;
   a second packet data serving node; and
   when the dormant wireless terminal moves to the third radio access network, the third radio access network selects the second packet data serving node and establishes and A10 connection to the second packet data sewing node via A11 signaling comprising a Previous Access Network ID, Current Access Network ID, wireless terminal ID, and wireless terminal dormancy indication; and
   when an AAA server notices that the wireless terminal IP address has changed, the AAA server removes the reachability information for the wireless terminal and releases the wireless terminal IP address for future allocation.

4. A network that provides a push service while conserving network resources including a PPP state and an A10 connection, comprising:
- a wireless terminal having an IP address associated therewith
- a first packet data serving node that, responsive to wireless terminal profile information, creates reachability information for the wireless terminal;
- a first radio access network that generates a dormant indication upon detecting that the wireless terminal is dormant, and wherein, upon receiving the dormant indication, the first packet data serving node removes the PPP state and requests that the first radio access network release the A10 connection; and wherein the first radio access network that initially has an A10 connection with the first packet data serving node, and further wherein the first radio access network detects that the wireless terminal is dormant, and sends a dormant indication to the first packet data serving node via A11 signaling;
- a home agent,
- wherein the first packet data serving node sends Mobile IP Agent Advertisements to the wireless terminal, and the wireless terminal performs Mobile IP registration, and if a Foreign Agent Challenge authentication is successful, an AAA server conveys wireless terminal profile information to the first packet data serving node, and
- if the registration is successfUl, the home agent conveys a home address of the wireless terminal in a Mobile IP Registration Reply.

5. A method for providing a push data service to a dormant terminal while conserving network resources in a network, comprising:
- releasing selected network resources associated with the dormant terminal;
- maintaining terminal profile information for reaching the dormant terminal; updating the terminal profile when a point of network attachment of the dormant terminal changes; wherein the terminal profile information comprises NIDS Reachability Information (NRI) for the terminal that comprises an Access Network ID (ANID), and wherein updating the terminal profile information for reaching the dormant terminal when the point of network attachment of the dormant terminal changes, comprises updating the Access Network ID in the NRI with a Current Access Network ID and requesting release of the A10 connection for the terminal undergoing an intra-PDSN handoff, further comprising:
- detecting a change when the dormant terminal moves to a different radio access network;
- establishing an A10 connection via A11 signaling that comprises a Previous Access Network ID, a Current Access Network ID, a terminal ID, and a terminal dormancy indication;
- determining, based on the terminal ID, that NRI for the terminal is present;
- determining, based on the received Previous Access Network ID, that intra-PDSN handoff is occurring;
- detecting a change when the dormant terminal moves to another radio access network;
- establishing an A10 connection via A11 signaling that also includes Previous Access Network ID, Current Access Network ID, terminal ID, and terminal dormancy indication;
- when the terminal IP address has changed, removing the NRI fro the dormant terminal and releasing the terminal IP address for future allocation;
- obtaining the terminal IP address and sending packets addressed to the terminal;
- routing the packets addressed to the terminal to a node that administers the terminal IP address;
- buffering the packets;
- obtaining, based on the destination IP address of the packets, the terminal ID and PCF address from the NRI;
- requesting, via A11 signaling, establishment of an A10 connection for the terminal, and after the A10 connection is established, initiating PPP negotiation with the terminal;
- during Internet Protocol Control Protocol, assigning the same terminal IP address from the NRI;
- delivering packets to the dormant terminal via the another radio access network;
- releasing the A10 connection and PPP states; and
- maintaining NRI for the terminal.

6. A method for providing a push data service to a dormant terminal while conserving network resources in a network, comprising:
- releasing selected network resources associated with the dormant terminal;
- maintaining terminal profile information for reaching the dormant terminal; updating the terminal profile when a point of network attachment of the dormant terminal changes; wherein the terminal profile information comprises NIDS Reachability Information (NRI) for the terminal that comprises an Access Network ID (ANID) and wherein updating the terminal profile information for reaching the dormant terminal when the point of network attachment of the dormant terminal comprises updating the Access Network IF in the NRI with a Current Access Network ID and requesting release of the A10 connection for the terminal upon undergoing an intra-PDSN handoff, and further wherein maintaining terminal profile information for reaching the dormant terminal comprises maintaining NRI for reaching the dormant terminal; and
- wherein maintaining NRI for reaching the terminal, comprises:
- maintaining the NRI and a visitor list entry for reaching the terminal.

7. A method for providing a push data service to a dormant terminal while conserving network resources in a network, comprising:
- releasing selected network resources associated with the dormant terminal;
- maintaining terminal profile information for reaching the dormant terminal; updating the terminal profile when a point of network attachment of the dormant terminal changes; wherein the terminal profile information comprises NIDS Reachability Information (NRI) for the terminal that comprises an Access Network ID (ANID), and wherein updating the terminal profile information for reaching the dormant terminal when the point of network attachment of the dormant terminal comprises updating the Access Network IF in the NRI with a Current Access Network ID and requesting release of the A10 connection for the terminal upon undergoing an intra-PDSN handoff,
- maintaining NRI at a packet data serving node for reaching the dormant terminal to deliver the push data to the dormant terminal; and
- wherein maintaining the NRI for reaching the terminal, comprises:
- maintaining the NRI and visitor list entry for reaching the terminal.

* * * * *